US011148896B2

(12) United States Patent  
Vargas et al.

(10) Patent No.: US 11,148,896 B2  
(45) Date of Patent: Oct. 19, 2021

(54) SUPPLY DEVICE FOR A DOUBLE-BELT PRESS, DOUBLE-BELT PRESS SYSTEM AND OPERATING METHOD

(71) Applicant: Held Technologie GmbH, Trossingen-Schura (DE)

(72) Inventors: Edgardo Vargas, Trossingen (DE); Christian Schnepf, Spaichingen (DE)

(73) Assignee: Held Technologie GmbH, Trossingen-Schura (DE)

( * ) Notice: Subject to any disclaimer, the term of this patent is extended or adjusted under 35 U.S.C. 154(b) by 177 days.

(21) Appl. No.: 16/606,788

(22) PCT Filed: Apr. 17, 2018

(86) PCT No.: PCT/EP2018/059759  
§ 371 (c)(1),  
(2) Date: Oct. 21, 2019

(87) PCT Pub. No.: WO2018/192916  
PCT Pub. Date: Oct. 25, 2018

(65) Prior Publication Data  
US 2020/0376792 A1    Dec. 3, 2020

(30) Foreign Application Priority Data  
Apr. 21, 2017 (EP) ..................... 17167540

(51) Int. Cl.  
*B30B 5/06* (2006.01)  
*B65H 23/182* (2006.01)  
(Continued)

(52) U.S. Cl.  
CPC ............. *B65H 23/182* (2013.01); *B30B 5/06* (2013.01); *B30B 15/30* (2013.01);  
(Continued)

(58) Field of Classification Search  
CPC ........... B30B 5/06; B32B 37/20; B65H 16/00; B65H 23/182  
See application file for complete search history.

(56) References Cited

U.S. PATENT DOCUMENTS 3,106,360 A * 10/1963 Kohler ............... B65H 19/1815  
242/555.6  
3,702,086 A    11/1972 Moss  
(Continued)

FOREIGN PATENT DOCUMENTS

DE    4219226 C2    10/1994  
DE    19921041 A1    11/2000  
(Continued)

OTHER PUBLICATIONS

International search report for patent application No. PCT/EP2018/059759 dated Jul. 19, 2019.

*Primary Examiner* — Philip C Tucker  
*Assistant Examiner* — John Blades  
(74) *Attorney, Agent, or Firm* — Bachman & LaPointe, PC; George Coury

(57) ABSTRACT

A supply device (3) for supplying substrate strips (10, 10'; 11, 11') to a double-belt press (2) for pressing the substrate strips (10, 10'; 11, 11') together includes unwinding stations (4, 5) each having an unwinding shaft (6, 7) for receiving a substrate strip roll (8, 9) and serving to unwind the substrate strips (10, 10'; 11, 11') from the substrate strip roll (8, 9), at least one of the unwinding stations (4) having a force-measuring device with a measuring shaft (16, 17) around which one of the substrate strips (10, 10'; 11, 11') can be wrapped, an auxiliary shaft (18, 19) being assigned to the measuring shaft, wherein the auxiliary shaft (18, 19) and the measuring shaft (16, 17) of the unwinding station (4) are moveable relative to each other between a guiding position for guiding the substrate strip (10, 10'; 11, 11') from the roll of the substrate strip rolls (8, 9) through a gap between the measuring shaft (16, 17) and the auxiliary shaft (18, 19) and  
(Continued)

an operating position defining a pre-defined and/or pre-definable wrap angle (χ) of the substrate strip (10, 10'; 11, 11') around the measuring shaft (16, 17) by an adjusting drive.

18 Claims, 1 Drawing Sheet

(51) Int. Cl.
*B30B 15/30* (2006.01)
*B32B 37/10* (2006.01)
*B32B 37/20* (2006.01)
*B32B 41/00* (2006.01)
*B65H 16/00* (2006.01)
*B65H 19/18* (2006.01)

(52) U.S. Cl.
CPC ......... *B32B 37/1027* (2013.01); *B32B 37/20* (2013.01); *B32B 41/00* (2013.01); *B65H 16/00* (2013.01); *B65H 19/1884* (2013.01); *B65H 2515/30* (2013.01)

(56) References Cited

U.S. PATENT DOCUMENTS

| | | | |
|---|---|---|---|
| 4,165,842 A | | 8/1979 | Mengel |
| 6,386,477 B1 * | | 5/2002 | Kaufmann ........... B65H 16/103 |
| | | | 242/555.3 |
| 9,309,081 B2 * | | 4/2016 | Duehring .............. B65H 23/048 |
| 2008/0223973 A1 * | | 9/2008 | Endo ...................... B65H 19/26 |
| | | | 242/412.1 |

FOREIGN PATENT DOCUMENTS

| | | |
|---|---|---|
| DE | 10146631 A1 | 4/2003 |
| DE | 102015106747 B3 | 6/2016 |
| EP | 0881181 A2 | 12/1998 |
| EP | 2371748 A2 | 10/2011 |
| EP | 2489619 A1 | 8/2012 |
| GB | 2170485 A | 8/1986 |
| GB | 2170486 A | 8/1986 |

* cited by examiner

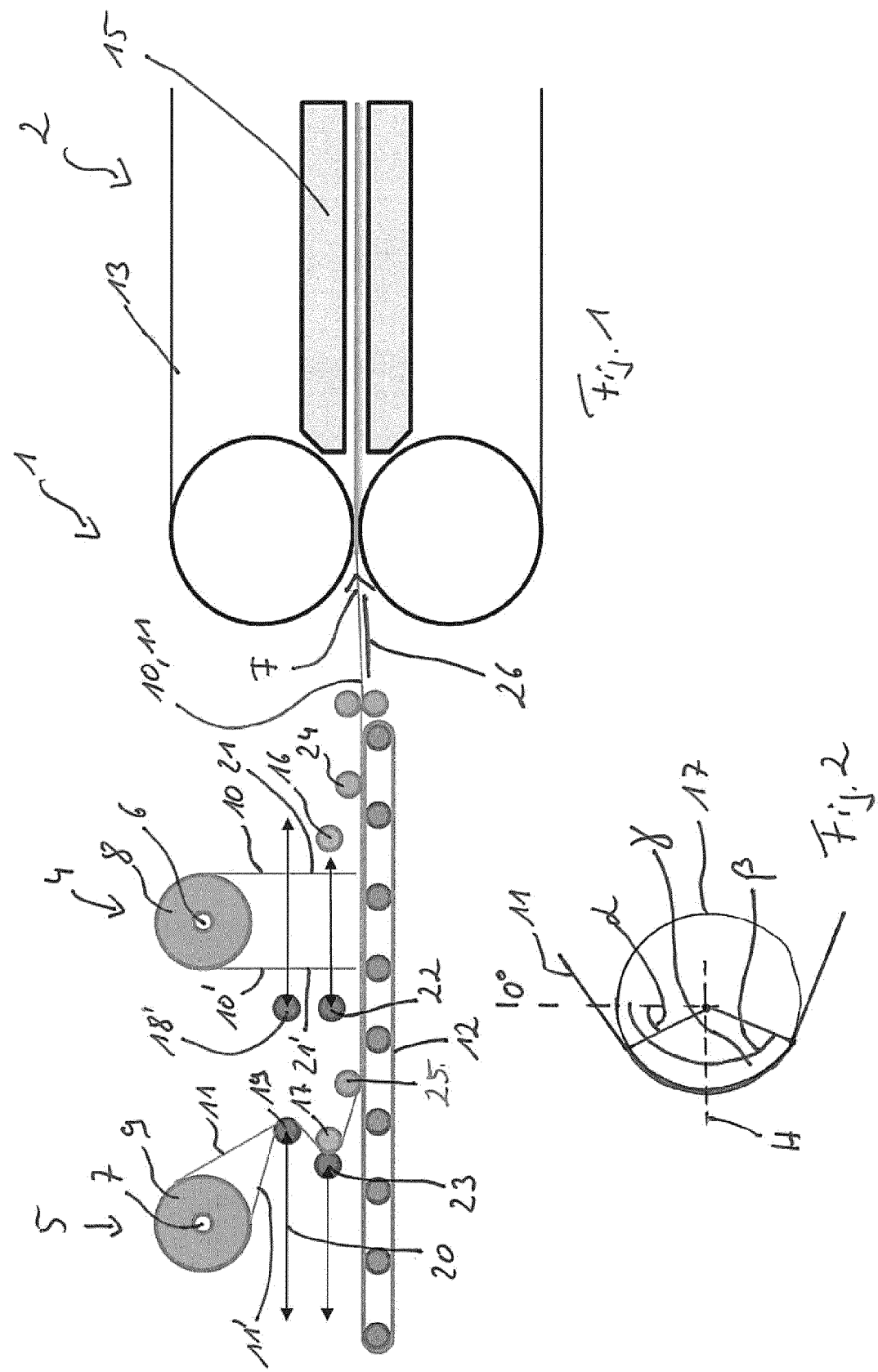

SUPPLY DEVICE FOR A DOUBLE-BELT PRESS, DOUBLE-BELT PRESS SYSTEM AND OPERATING METHOD

BACKGROUND OF THE INVENTION

The invention relates to a supply device for supplying several substrate strips (in other words substrate webs) which can each be unwound from a substrate strip roll to a double-belt press for pressing the substrate strips together, comprising several unwinding stations each comprising an unwinding shaft for receiving a respective substrate strip roll and serving to unwind the substrate strips from the respective substrate strip roll, at least one of the unwinding stations comprising a force-measuring device with a measuring shaft around which a corresponding one of the substrate strips can be wrapped, an auxiliary shaft for the corresponding one of the substrate strips being assigned to the measuring shaft. In this context, "can be wrapped" means that the measuring shaft is disposed in such a manner that when the respective unwinding station is equipped with a substrate strip roll, the corresponding substrate strip can be applied to said measuring shaft across a circumferential angle of less than 360°, in particular less than 180°. Furthermore, the invention relates to a system, comprising such a supply device and a double-belt press which is disposed downstream of said supply device. Additionally, the invention relates to a method for operating a supply device according to the invention and/or a (double-belt press) system according to the invention.

Double-belt presses for pressing substrate strips which are unwound from substrate strip rolls together are generally known and described, for example, in DE 42 19 226 C2. In order to produce decorative laminates, particle boards, fiberboards, plywood boards, electronic laminates, etc., the material to be pressed (several substrate strips which are disposed above one another) are to be exposed to a high pressure and a high temperature so that, in particular, the resin of substrate strips which are preferably resinous or made of resin is completely cured and the (pressed) products have the required quality. Double-belt presses normally operate continuously and comprise two continuous steel strips which transmit the pressure and the required quantity of heat to the material to be pressed and which simultaneously pull said material through the double-belt press. The pressure is usually transmitted mechanically by rolls which roll off on the press belts or hydraulically by means of fluid pressure means, in particular chambers which are filled with oil and which are sealed to the exterior.

Concerning known double-belt presses, the laborious manual supply of the substrate strip to the double-belt press is problematic, in particular after an exchange of the substrate strip rolls. So far, the one flag (end section) of a new substrate strip has been guided manually towards the double-belt press until the new substrate strip has been picked up by the other substrate strips, in particular clamped and/or pulled by the double-belt press. Since usually a plurality of substrate strips is pressed together in double-belt presses, an extensive deployment of personnel and an increased attention of the operating personnel are required. A particularly laborious supply step is to place a new substrate strip around a measuring shaft by means of which a force exerted on the measuring shaft by the substrate strip is measured during operation—said force is proportional to the traction acting on the substrate strip and is used to control a braking torque which is applied to the unwinding shaft to maintain a desired substrate strip tension once the substrate strip has been gripped and is being transferred by the double-belt press. So far, the substrate strip has been placed manually around two fixed auxiliary shafts, which are assigned to the measuring shaft and disposed so as to be rotatable, and around the measuring shaft in order to ensure a constant wrap angle of the substrate strip around the measuring shaft, said wrap angle facilitating the control of the braking torque because, depending on a changing wrap angle, the force absorbed by the measuring shaft would change as well. There are alternative solutions which consider or remove the impact of the wrap angle, but this requires either a sensing of the decreasing diameter of the substrate strip roll and/or an evaluation of a rotational speed of the substrate strip roll and of a conveying speed of the double-belt press or of the substrate strip by the double-belt press. In summary, this results in inaccuracies with respect to the control of the braking torque and increases complexity.

With respect to the processing of paper or cardboard, an unwinding station which is disposed upstream of a gluing device is known from EP 0 881 181 A2, a pivotable guiding roll disposed upstream of an adhesive device and provided with a drive, if required, being provided for adjusting the material web tension. However, the guiding roll cannot render superfluous a manual supply of the material web to the gluing device of a new material roll. This means that in EP 0 881 181 A2, too, the material web has to be manually placed around the guiding roll when exchanging the rolls.

SUMMARY OF THE INVENTION

Starting from the aforementioned state of the art, the object of the invention is to indicate an improved supply device for substrate strip rolls to a double-belt press and a system comprising such a supply device and a double-belt press which allow for a facilitated, in particular automated supply of a new substrate strip or substrate strip flag and which ensure a defined wrap angle of the substrate strip around the (force) measuring shaft, said wrap angle extending between an inlet angle and an outlet angle.

The inlet angle is to be understood as the angle (the angular position around the measuring shaft) at which the substrate strip meeting the measuring shaft, preferably tangentially, comes into contact with the measuring shaft (at the inlet side) for the first time. The outlet angle is the angle at which the substrate strip leaves the measuring shaft, in particular tangentially, at the outlet side. The wrap angle is spanned between the inlet angle and the outlet angle, the bisector of said wrap angle preferably remaining at the same angular position during the entire unwinding process. Said bisector is preferably parallel to the radial measurement axis of the measuring shaft. The inlet angle and the outlet angle are preferably measured in the same circumferential direction starting from a radial zero angle line which is preferably formed by a radial which extends upwards in a vertical direction starting from the axis of rotation of the measuring shaft.

Furthermore, the object is to indicate a method for operating such a supply device and/or such a system.

Concerning the supply device, said object is attained by the features disclosed herein, i.e., in a generic supply device, by the fact that, in contrast to the state of the art, the auxiliary shaft and the measuring shaft are not disposed in a fixed manner relative to one another but can be moved relative to one another between a relative guiding position for, in particular automatic, guiding of the corresponding substrate strip from the corresponding one of the substrate strip rolls through a gap between the measuring shaft and the auxiliary shaft and a relative operating position defining a pre-defined and/or pre-definable wrap angle of the corresponding substrate strip around the measuring shaft by means of relative adjusting drive means.

Concerning the system, the object is attained by the features disclosed herein, and concerning the method, the object is attained by the features disclosed herein, i.e., in a generic method, by disposing a substrate strip roll on the unwinding shaft of at least the first unwinding station and, preferably before and/or during and/or after said disposing, by moving the auxiliary shaft and the measuring shaft away from one another into the relative guiding position, in particular by moving the auxiliary shaft to the preferably fixed measuring shaft, and by guiding the substrate strip from the substrate strip roll through the gap between the auxiliary shaft and the measuring shaft, preferably by driving the unwinding shaft, and by adjusting a wrap angle of the substrate strip around the measuring shaft by moving the auxiliary shaft and the measuring shaft relative to one another into their relative operating position.

Advantageous embodiments of the invention are also disclosed herein and in the dependent claims. All combinations of at least two features disclosed in the description, the claims and/or the figures constitute part of the scope of the invention.

In order to avoid repetitions, disclosed features relating to the method are also seen as relating to the device and are thus also claimable therefor. In the same manner, disclosed features relating to the device are also seen as relating to the method and are thus also claimable therefor.

In contrast to the state of the art, where the auxiliary shaft disposed upstream of the measuring shaft in a transfer direction of a substrate strip and the measuring shaft are disposed in a fixed manner relative to one another, the idea of the invention is to dispose said shafts in such a manner that they are moveable relative to one another by means of a drive (relative adjusting drive means), in particular perpendicular to a respective longitudinal extension of the shafts (radially) between a relative guiding position and a relative operating or adjusting position. In the relative guiding position, the measuring shaft and the auxiliary shaft are disposed relative to one another or spaced apart from one another in such a manner that a (new) substrate strip or its end section (substrate strip flag) can be guided, particularly preferably in an automated manner, through the gap, in particular downwards in a vertical direction, in particular by rotating the corresponding substrate strip roll and its unwinding shaft by means of an (unwinding) drive which is assigned thereto. In the relative operating position, the auxiliary shaft is in contact with the substrate strip or the substrate strip is supported by the auxiliary shaft in an area in front of the measuring shaft in the transfer direction of the substrate strip, an inlet angle of the substrate strip onto the measuring shaft and, therefore, a wrap angle of the substrate strip around the measuring shaft thus being defined or pre-defined via the relative position of the measuring shaft and the auxiliary shaft in the relative operating position, thus ensuring the same inlet situation irrespective of the diameter of the substrate strip rolls. Said inlet angle and, therefore, the wrap angle are preferably constant during the unwinding process, in which the corresponding substrate strip and the other substrate strips are pressed together within the scope of a downstream double-belt press, in order to dispense with a sensing or calculation of the inlet angle and/or a wrap angle defined by the inlet angle. In this regard, the supply device according to the invention allows for a first embodiment in which an inlet angle is pre-defined. In an alternative embodiment, the inlet angle can be selected or pre-defined, for example by a user input, in particular within the scope of a basic parameterization or in an automated manner depending on at least one parameter. In said alternative embodiment, it is possible, in particular, to choose between different inlet angles or to define any inlet angle. The supply device according to the invention allows for a convenient guiding, either manual or preferably automatic, of the corresponding substrate strip, in particular of the substrate strip flag, from above in the relative guiding position of the auxiliary shaft and the measuring shaft, for example by rotating the unwinding shaft by means of an unwinding drive; manual placement around the auxiliary shaft is not required. According to the invention, the application of the auxiliary shaft to the substrate strip can be realized in an automatic manner via the relative adjusting drive means by moving the auxiliary shaft from the relative guiding position into a relative operating position defining the inlet angle and/or by moving the measuring shaft relative to the auxiliary shaft to adjust the relative operating position. In a particularly preferred embodiment, the measuring shaft is disposed so as to be fixed and the auxiliary shaft can be moved relative to said measuring shaft, in particular in a translational manner, particularly preferably perpendicular to the respective longitudinal extension of the shaft, even more preferably horizontally via the relative adjusting drive means. In order for both the inlet angle and the outlet angle of the substrate strip from the measuring shaft, which defines the wrap angle together with the inlet angle, to be kept at a constant level during the unwinding process, an embodiment of the invention provides a deflection shaft which is located at the outlet side or which is disposed downstream of the measuring shaft in the transfer direction of the substrate strip. After an automatic transfer to the transfer means, the substrate strip is preferably picked up by the transfer means in the transfer direction, in particular in a translational manner, and is moved against the aforementioned deflection shaft. A particularly high degree of automation is achieved in this way.

An angle (circumferential position) of the bisector of the wrap angle in the global coordinate system defining the inlet angle and the outlet angle is preferably constant (irrespective of a substrate strip roll and its changing diameter), the radial bisector being preferably aligned parallel to the radial measurement axis of the measuring shaft.

The supply device according to the invention comprises several unwinding stations for unwinding a substrate strip from a substrate strip roll which is disposed on an unwinding shaft. The auxiliary shaft and the measuring shaft can be moved relative to one another in the aforementioned manner, preferably not only in a sole unwinding station, but in several of the unwinding stations, particularly preferably in the majority of the unwinding stations, more preferably in all unwinding stations, in order to allow for facilitated, in particular automatic guiding of the respective substrate strip through the gap between the respective measuring shaft and the respective auxiliary shaft in their relative guiding position and in order to ensure a desired inlet angle of the substrate strip onto the corresponding measuring shaft in the relative operating position. A deflection shaft for defining a fixed outlet angle at the outlet side is particularly preferably assigned to the respective measuring shaft in the transfer direction of the respective substrate strip. The other embodiments are to be understood in the same manner. According to a minimum requirement, said embodiments can be realized at one unwinding station—however, said embodiments are preferably realized at several, in particular the majority of, more preferably all unwinding stations.

In an advantageous embodiment of the invention, the auxiliary shaft is disposed along a vertical in an area above the measuring shaft and below the unwinding shaft. Preferably, no additional shaft is in contact with the substrate strip and/or deflects said substrate strip between the auxiliary shaft and the measuring shaft in front of the measuring shaft in the transfer direction of the substrate, the auxiliary shaft thus being the sole shaft defining the inlet angle together with the measuring shaft.

In general, the substrate strip rolls are not part of the supply device; instead, said substrate strip rolls are consumables. In order to define a preferred feature or assembly of the auxiliary shaft and the measuring shaft, which is described below, a substrate strip roll can be seen as a part of the supply device. In this case, the auxiliary shaft and the measuring shaft are preferably disposed relative to one another in the relative guiding position in such a manner that the substrate strip of said substrate strip roll can be guided, preferably irrespective of a direction of the unwinding rotation of the unwinding shaft, in a straight line along a vertical through the gap between the auxiliary shaft and the measuring shaft, preferably in an automated manner, particularly preferably as far as to optional joint transfer means, which are described below. In other words, the auxiliary shaft and the measuring shaft are preferably spaced apart from one another in the relative guiding position in such a manner that the substrate strip flag can be guided, in particular transferred, in a straight line downwards through the gap between the measuring shaft and the auxiliary shaft, in particular in a vertical manner, irrespective of whether the substrate strip flag is unwound clockwise or counterclockwise. The gap between the shafts in the relative guiding position thus corresponds at least to the diameter of the substrate strip roll and is particularly preferably larger than said diameter.

As indicated above, the unwinding shaft is particularly preferably assigned unwinding drive means for a rotating driving of the unwinding shaft. Said unwinding drive means are preferably an electric motor, thus allowing for an automated guiding of a new substrate strip or substrate strip flag through the gap between the auxiliary shaft and the measuring shaft in the relative guiding position. In a particularly preferred embodiment, the unwinding drive means simultaneously form the brake means by acting as or being controlled as a motor brake. The brake function can be used to maintain a defined substrate strip tension when the substrate strip reaches the operating area of the double-belt press.

In an embodiment of the invention, the unwinding drive means can be controlled by control means which are assigned to them in such a manner that they drive the unwinding shaft to unwind a corresponding substrate strip from a substrate strip roll which is accommodated on the unwinding shaft in order to guide the corresponding substrate strip in an automated manner through the gap between the measuring shaft and the auxiliary shaft in the relative guiding position. As also indicated above, the at least one unwinding station preferably has brake means which are preferably formed by the unwinding drive means in the form of a motor brake for applying a braking torque to the corresponding substrate strip rolls, in particular to the unwinding shaft, the brake means preferably being controllable via control means depending on a sensor signal of the force measuring means to adjust (control) the braking torque depending on the traction acting on the substrate strip. In other words, the braking torque is adjusted depending on the adjusted (target) traction and the measured (actual) traction, the force measured by the measuring shaft perpendicular to the longitudinal extension of the measuring shaft being proportional to said traction and thus to the tensile stress depending on the width of the substrate strip and thus being usable as an input variable for said control.

In an embodiment of the invention, at least a group of unwinding stations which are preferably disposed adjacent to one another in the transfer direction of the substrate strips towards the double-belt press, preferably all unwinding stations, are assigned joint transfer means by means of which the substrate strips which are unwound from the unwinding shaft, preferably by driving the unwinding shafts by means of a respective unwinding shaft drive or which are unwound in an automated manner at the active drive, can be driven, preferably in a translational manner, particularly preferably horizontally in the transfer direction towards the double-belt press, preferably into the double-belt press, in order to increase the degree of automation. By providing such transfer means for transferring the substrate strips, previously required manual guiding of the substrate strips towards the double-belt press is no longer necessary. In this regard, the transfer means are particularly preferably disposed in an area along a vertical below the group of unwinding stations, preferably below all unwinding stations, so that the substrate strips can be received from above and can be transferred towards the double-belt press, i.e. in the transfer direction. It is particularly useful if the substrate strips are supported by the transfer means during the transfer by resting on said transfer means during the transport towards the double-belt press.

In general, the transfer means may extend directly to the double-belt press or even partly into the receiving area of the double-belt press so that a manual operation for inserting the substrate strips or a new substrate strip into the double-belt press can be dispensed with. It is also possible to realize an embodiment in which a possible gap between the transfer means and an inlet area of the double-belt press in the transfer direction is bridged by guide means, such as an infeed table or a roll assembly, for the preferably supporting guiding of the substrate strips from the transfer means into the double-belt press. Using the transfer means, new substrate strips are pushed over said guide means and/or pulled over substrate strips which are already clamped in the double-belt press.

In general, the transfer means according to the invention considerably facilitate the supply of new substrate strips to the double-belt press—an exceptional facilitation is provided in particular to the (first) substrate strip which is furthest from the double-belt press in the transfer direction, because, so far, said substrate strip could not be supported from below by other substrate strips which might have already been inserted and which are disposed further forward in the transfer direction; instead, said former substrate strips had to be manually guided forward in the transfer direction to the double-belt press. An automated or facilitated supply of said first substrate strip can be ensured via the transfer means, in particular if the transfer means are also located in an area below said first fed unwinding station.

With respect to the specific configuration of the transfer means, different possibilities are available. In a particularly preferred embodiment, the transfer means are configured as a conveyor belt which is preferably disposed below the unwinding stations and or on which the respective substrate strips are or can be placed or to which the respective substrate strips are supplied, in particular in an automated manner, as already mentioned, for example, by means of unwinding drive means for driving an unwinding shaft of the respective unwinding station which receives a substrate strip roll and/or by driving a preferably provided clamp shaft, which will be described below, and/or a measuring shaft which interacts with said clamp shaft, and/or by means of any other drive.

The transfer means are preferably configured and disposed in such a manner that, by means of said transfer means, a last substrate strip in the transfer direction can be received by a first unwinding station of the group of unwinding stations in the transfer direction, preferably by all unwinding stations, in particular in an automated manner, and that said substrate strip can be transferred towards the double-belt press—this can be achieved by disposing the joint transfer means in an area below the first substrate strip roll in the transfer direction or the first unwinding station in the transfer direction and/or the first operating unwinding station in the transfer direction—without the transfer means, the first and thus lowest substrate strip would have to be guided or transported manually towards the double-belt press.

In a particularly preferred embodiment of the supply device, a clamp shaft is assigned to the measuring shaft, the clamp shaft and the measuring shaft being moveable relative to one another, in particular towards one another or away from one another perpendicular to their longitudinal extension, by means of adjusting drive means, between a relative spaced position in which they are spaced apart from one another and in which the corresponding substrate strip can be guided, in particular transferred through the gap between the clamp shaft and the measuring shaft, in particular along a vertical, particularly preferably in an automated manner, and a relative clamping position in which the clamp shaft and the measuring shaft clamp the corresponding substrate strip. The adjusting drive means can preferably be controlled by control means in such a manner that there is an initial relative movement of the clamp shaft and the measuring shaft into the relative clamping position for clamping the substrate strip before the auxiliary shaft and/or the measuring shaft is/are driven into the relative adjustment position in order to avoid a pulling back of the corresponding substrate strip flag. In a preferred embodiment, the clamp shaft can be actively moved or driven relative to the preferably fixed measuring shaft via the adjusting drive means.

In a particularly preferred embodiment of the supply device, the clamp shaft and/or the measuring shaft can be actively driven in a rotating manner via transfer drive means in order to support the unwinding process, at least temporarily, and/or to actuate said unwinding process substantially alone, in particular until the corresponding substrate strip is driven or pulled automatically by the double-belt press. In a preferred manner, only the clamp shaft is driven by a motor.

In a particularly preferred embodiment, the corresponding substrate strip can be transferred or is transferred to the transfer means by a rotating driving of the clamp shaft and/or of the measuring shaft in order to be transported towards the double-belt press by said transfer means, preferably in a translational manner. In a preferred manner, a (new) substrate strip is guided or transported by the transfer means against an aforementioned optional deflection shaft which is disposed downstream of the measuring shaft, said deflection shaft defining a fixed outlet angle of the substrate strip from the measuring shaft together with the measuring shaft.

Furthermore, the invention relates to a system comprising an aforementioned supply device configured according to the idea of the invention and a double-belt press disposed downstream of said supply device for pressing the several substrate strips together. In an overall advantageous manner, at least one of the substrate strips, preferably several of the substrate strips are resinous or made of a material, in particular resin, which melts and/or cures when it is exposed to pressure or temperature in the double-belt press. In this regard, the double-belt press is preferably configured in such a manner that a pressure from a range between 5 bar and 80 bar (or higher) and/or a temperature from a temperature range between 60° C. and 400° C. (or higher) can be applied to the substrate strips by said double-belt press.

Additionally, the invention relates to a method for operating a supply device according to the invention and/or a system according to the invention which has been at least partially explained above. According to the invention, a substrate strip roll is disposed on the unwinding shaft of at least the first unwinding station (preferably on several unwinding stations which are configured according to the invention) and, in particular before and/or during and/or after said disposing, the auxiliary shaft and the measuring shaft are moved into the relative guiding position, in particular perpendicular to their longitudinal extension, in particular by an (active) adjustment of the auxiliary shaft to the preferably fixed measuring shaft, and the substrate strip from the substrate strip roll is guided, in particular transferred, through the gap between the auxiliary shaft and the measuring shaft, preferably by driving the corresponding unwinding shaft, and a wrap angle of the substrate strip around the measuring shaft is adjusted (in particular by adjusting the inlet angle) by moving the auxiliary shaft and the measuring shaft relative to one another into the relative operating position.

The corresponding substrate strip is preferably clamped between the measuring shaft and a clamp shaft and is preferably driven by the measuring shaft and the clamp shaft before the relative adjustment position is reached, in particular before the beginning of the relative movement between the auxiliary shaft and the measuring shaft. If an active drive is realized for the measuring shaft and/or the clamp shaft, the unwinding drive means preferably rotate along in a speed-controlled manner, for example, or drive the unwinding shaft. The substrate strip is preferably transferred towards the double-belt press by means of joint transfer means, in particular in such a manner that the transfer means move the substrate strip against an optional deflection shaft at the outlet side for defining an outlet angle of the substrate strip from the measuring shaft.

In a generally advantageous manner, a braking torque which is controlled depending on the force measured by means of the measuring shaft is applied to the substrate strip by brake means which are in particular formed by the unwinding drive means for driving the unwinding shaft or which are additionally provided and which are configured, for example, as a shoe brake and/or which comprise a brake disc.

BRIEF DESCRIPTION OF THE DRAWINGS

Advantageous embodiments of the invention can be derived from the following description of a preferred exemplary embodiment and from the drawings.

FIG. 1 is a system having a double-belt press and comprising a supply device according to the invention, and FIG. 2 is a schematic lateral view of the measuring shaft for defining the different angles.

DETAILED DESCRIPTION

In FIG. 1, a system 1 comprising a double-belt press 2 and a supply device 3 for substrate strips which is disposed upstream of said double-belt press is shown.

For reasons of clarification, supply device 3 comprises only two unwinding stations 4, 5 in the illustrated exemplary embodiment, more than two unwinding stations being provided behind one another in practice.

All unwinding stations comprise an unwinding shaft 6, 7 which can be rotated via electromotive unwinding drive means (not shown) in order to unwind a substrate strip 10, 11 from a respective substrate strip roll 8, 9 which is accommodated on corresponding unwinding shaft 6, 7. Depending on the unwinding direction, the substrate strips (substrate webs) are referenced with reference numerals 10, 11 (clockwise unwinding) or 10', 11' (counterclockwise unwinding) in FIG. 1.

In an area along a vertical V, transfer means 12, in an exemplary manner in the form of a conveyor belt, by means of which substrate strips 10, 11 which are unwound from a corresponding substrate strip roll 8, 9 at unwinding stations 4, 5 can be transferred in sections above one another as far as just in front of double-belt press 2 are provided below unwinding stations 4, 5. If required, transfer means 12 can be guided even closer towards double-belt press 2 or, alternatively, a guiding assembly (transfer means 26), in particular a baffle plate and/or an infeed table can be disposed in an area between transfer means 12 and double-belt press 2 in order to guide substrate strips 10, 11 into double-belt press 2 and to support them. (Driven) transfer means 12 actively transfer substrate strips 10, 11 in a translational manner, in a horizontal direction in the present case, towards double-belt press 2. Once substrate strips 10, 11 reach the operating area of two continuous circulating steel belts 13, 14 of double-belt press 2, said substrate strips are clamped and pulled by steel belts 13, 14, the unwinding drive means thus being applicable as brake means for acting on the corresponding substrate strip to adjust a desired traction and thus tensile stress. In the illustrated exemplary embodiment, combined means 15 for applying pressure and temperature to substrate strips 10, 11 (material to be pressed) in a manner known per se are shown inside double-belt press 2.

Concerning supply device 3, which is configured according to the idea of the invention, unwinding stations 4, 5 are functionally identical and each comprise a measuring shaft 16, 17 of force-measuring devices (not explicitly shown) for measuring a force which is applied to respective measuring shaft 16, 17 perpendicular to the longitudinal extension of the measuring shaft by corresponding substrate strip 10, 11. Each measuring shaft 16, 17 is assigned an auxiliary shaft 18, 19 which can be moved relative to corresponding measuring shaft 16, 17 between a relative guiding position, which is illustrated at unwinding station 4 on the right in the drawing layer, and a relative operating position, which is shown in unwinding station 5 on the left in the drawing layer, in an exemplary manner driven translationally along arrow directions 20, via relative adjusting drive means (not shown), such as electromotive or hydraulic or pneumatic relative adjusting drive means. In the present exemplary embodiment, measuring shafts 16, 17 are disposed so as to be fixed and corresponding auxiliary shaft 18, 19 can be moved via the relative adjusting drive means. Additionally or alternatively, corresponding measuring shaft 16, 17 can be configured so as to be driven via the relative adjusting drive means.

In the relative guiding position shown in unwinding station 4 on the right in the drawing, substrate strip 10 or 10', more precisely the end section or flag 21 or 21', can be guided along vertical V in a straight line downwards through the horizontal gap between measuring shaft 16 and auxiliary shaft 18, preferably in an automated manner and irrespective of the unwinding direction, by driving corresponding substrate strip 8 via unwinding shaft 6 by means of the corresponding unwinding drive means (not shown).

Furthermore, FIG. 1 shows that a clamp shaft 22, 23 is disposed in an area along vertical V below each of measuring shafts 16, 17, said clamp shaft being moveable between a relative spaced position, which is illustrated at unwinding station 5 on the right in the drawing, and a clamping position, which is shown at unwinding station 4 on the left in the drawing, via corresponding adjusting drive means (not shown), clamp shaft 22, 23 clamping corresponding substrate strip 10, 11 in the respective clamping position.

In the specific exemplary embodiment of respective measuring shaft 16, 17, a deflection shaft 24, 25 for realizing a defined outlet angle of a substrate strip 10, 11 from respective measuring shaft 16, 17 is to be defined or determined behind corresponding measuring shaft 16, 17 in the corresponding transfer direction of substrate strip 10, 11.

When exchanging the rolls or starting the production, the procedure is preferably as follows: first, a substrate strip roll 8, 9 is disposed on a corresponding unwinding shaft 6, 7 at a respective unwinding station 4, 5. Auxiliary shaft 18 or 19 and measuring shaft 16, 17 are in the aforementioned relative supply position or are moved relative to one another into said relative supply position. Furthermore, corresponding clamp shaft 22, 23 and corresponding measuring shaft 16, 17 are in the relative spaced position shown on the right in the drawing. The unwinding drive means are then controlled via control means in such a manner that a substrate strip is unwound clockwise or counterclockwise and is therefore guided, more precisely transferred, along vertical V through a gap between corresponding measuring shaft 16, 17 and corresponding auxiliary shaft 18, 19 and through a gap between measuring shaft 16, 17 and clamp shaft 22, 23. Substrate strip 10, 10' or 11, 11' is thus adjusted downwards towards transfer means 12. After passing the gap between measuring shaft 16, 17 and clamp shaft 22, 23, clamp shaft 22, 23 is moved via the adjusting drive means into an aforementioned clamping position in which substrate strip 10, 10'; 11, 11' is clamped between measuring shaft 16, 17 and clamp shaft 22, 23. After that, auxiliary shaft 18, 19 is moved from the relative guiding position into the relative operating position (cf. on the left in FIG. 1), a defined inlet angle $\alpha$ thus being established. An outlet angle $\beta$, which is determined in a similar manner, is pre-defined via corresponding deflection shaft 24. Wrap angle $\chi$ of the respective substrate strip (cf. FIG. 2) and the corresponding measuring shaft result from the size of inlet angle $\alpha$ (cf. FIG. 2) and outlet angle $\beta$ (cf. FIG. 2), the force measured by respective measuring shaft 16, 17 being proportional to said wrap angle $\chi$. Radial bisector H of wrap angle $\chi$ remains at a pre-defined circumferential position and is parallel to the radial measurement axis of the measuring shaft in the present case. Clamp shaft 22, 23 can preferably be actively rotated via drive means and thus supports a transfer of substrate strip 10, 10'; 11, 11' onto and/or on transfer means 12. During said transfer, corresponding unwinding shaft 6 or its drive means rotates in a speed-controlled manner. Substrate strips 10, 10'; 11, 11' are then moved against corresponding deflection shaft 24, 25 by transfer means 12 in order to define aforementioned outlet angle $\beta$. Once substrate strips 10, 10'; 11, 11', which are disposed above one another, have been picked up or are driven by double-belt press 2, the unwinding drive means are controlled as brake means by controlling the applied braking torque exerted by them depending on a sensor signal of the force-measuring device, i.e. depending on the force applied to measuring shaft 16, 17 by substrate strip 10, 10'; 11, 11'.

FIG. 2 is an enlarged view of measuring shaft 17 according to FIG. 1 including the inlet and outlet situation of the substrate strip for a general definition of the angles which are described in the present disclosure. In a global coordinate system, a 0° angle is defined by a radial extending upwards in the vertical direction starting from an axis of rotation of the measuring shaft and being designated 0°. In said global coordinate system, inlet angle α is the angle between the aforementioned radial and the specific circumferential direction at which, substrate strip 11, which is supplied to measuring shaft 17 in a tangential manner (in relation to measuring shaft 17) starting from auxiliary shaft 19, comes into contact with the measuring shaft at the inlet side for the first time. Outlet angle β is defined in the same circumferential direction (counterclockwise, in an exemplary manner) starting from the 0° radial. Said angle is the angle at which substrate strip 11 leaves measuring shaft 17 at the outlet side or is in contact with measuring shaft 17 for the last time. Wrap angle χ is spanned between inlet angle α and outlet angle β, bisector H of said wrap angle χ preferably being kept at the same circumferential position during the unwinding process, the circumferential position being preferably selected in such a manner that bisector H is parallel to a radial measurement axis of the measuring shaft.

REFERENCE SIGNS 1 system
2 double-belt press
3 supply device
4 unwinding station
5 unwinding station
6 unwinding shaft
7 unwinding shaft
8 substrate strip roll
9 substrate strip roll
10, 10' substrate strip
11, 11' substrate strip
12 transfer means
13 steel strip
14 steel strip
15 heating and pressure application means
16 measuring shaft
17 measuring shaft
18 auxiliary shaft
19 auxiliary shaft
20 arrow directions
21 flag
22 clamp shaft
23 clamp shaft
24 deflection shaft
25 deflection shaft
26 transfer means
V vertical
F transfer direction
H bisector of wrap angle χ
α inlet angle
β outlet angle
χ wrap angle

The invention claimed is:

1. A supply device (3) for supplying several substrate strips (10, 10'; 11, 11') to a double-belt press (2) for pressing the substrate strips (10, 10'; 11, 11') together, comprising several unwinding stations (4, 5) each comprising an unwinding shaft (6, 7) for receiving a respective substrate strip roll (8, 9) and serving to unwind the substrate strips (10, 10'; 11, 11') from the respective substrate strip roll (8, 9), at least one of the unwinding stations (4) comprising a force-measuring device with a measuring shaft (16, 17) around which a corresponding one of the substrate strips (10, 10'; 11, 11') can be wrapped, an auxiliary shaft (18, 19) for the corresponding one of the substrate strips (10, 10'; 11, 11') being assigned to the measuring shaft, wherein the auxiliary shaft (18, 19) and the measuring shaft (16, 17) of the at least one unwinding station (4) are moveable relative to each other between a relative guiding position for guiding of the corresponding substrate strip (10, 10'; 11, 11') from a corresponding roll of the substrate strip rolls (8, 9) under gravity through a gap between the measuring shaft (16, 17) and the auxiliary shaft (18, 19), and a relative operating position defining a pre-defined and/or pre-definable wrap angle (y) of the corresponding substrate strip (10, 10'; 11, 11') around the measuring shaft (16, 17) by means of relative adjusting drive means.

2. The supply device according to claim 1, wherein the auxiliary shaft (18, 19) is disposed along a vertical (V) in an area above the measuring shaft (16, 17) and below the unwinding shaft (6, 7).

3. The supply device according to claim 1, wherein the measuring shaft (16, 17) is disposed so as to be fixed and the auxiliary shaft (18, 19) can be moved relative to the measuring shaft (16, 17) at a variable distance between the relative guiding position and the relative operating position by means of the relative adjusting drive means.

4. The supply device according to claim 1, wherein a substrate strip roll (8, 9) is disposed on the unwinding shaft (6, 7) of the at least one unwinding station (4, 5), and wherein the auxiliary shaft (18, 19) and the measuring shaft (16, 17) are disposed relative to one another in the relative guiding position in such a manner that the substrate strip from the substrate strip roll (8, 9) can be guided in a straight line along a vertical (V) through the gap between the auxiliary shaft (18, 19) and the measuring shaft (16, 17).

5. The supply device according to claim 1, wherein drive means for a rotating driving of the unwinding shaft (6, 7) are assigned to the unwinding shaft (6, 7).

6. The supply device according to claim 5, wherein the unwinding drive means are assigned control means which are configured to control the unwinding drive means in such a manner that they drive the unwinding shaft (6, 7) to unwind a corresponding one of the substrate strips (10, 10'; 11, 11') from a substrate strip roll (8, 9) accommodated on the unwinding shaft (6, 7) in order to transfer the corresponding substrate strip (10, 10'; 11, 11') in an automated manner through the gap between the measuring shaft (16, 17) and the auxiliary shaft (18, 19).

7. The supply device according to claim 1, wherein the at least one unwinding station (4) has brake means, formed by an unwinding drive means, for applying a braking torque to the corresponding one of the substrate strip rolls (8, 9), the brake means being controllable via the drive means depending on a sensor signal of the force-measuring device for adjusting the braking torque depending on the traction acting on the substrate strip.

8. The supply device according to claim 7, wherein the brake means apply a braking torque to the unwinding shaft (6, 7).

9. The supply device according to claim 1, wherein a deflection shaft (24, 25) around which the corresponding one of the substrate strips (10, 10'; 11, 11') can be wrapped is disposed at an outlet side of the measuring shaft (16, 17)

for defining a pre-defined and/or pre-definable outlet angle (p) of the corresponding one of the substrate strips (10, 10'; 11, 11') from the measuring shaft (16, 17).

10. The supply device according to claim 1, wherein joint transfer means (12) which are driven in a rotating manner and disposed adjacent to one another for transferring the substrate strips (10, 10'; 11, 11'), horizontally, towards the double-belt press (2), into the double-belt press (2), are disposed downstream of the unwinding stations (4, 5).

11. The supply device according to claim 10, wherein the joint transfer means (12) comprises a conveyor belt and/or a plurality of conveying rollers.

12. The supply device according to claim 1, wherein a clamp shaft (22, 23) is assigned to the measuring shaft (16, 17) and wherein the clamp shaft (22, 23) and the measuring shaft (16, 17) can be moved relative to one another towards one another and away from one another via adjusting drive means between a relative spaced position in which the corresponding one of the substrate strips (10, 10'; 11, 11') can be guided, transferred, through a gap between the clamp shaft (22, 23) and the measuring shaft (16, 17), along a vertical (V) and in an automated manner, and a relative clamping position in which the corresponding one of the substrate strips (10, 10'; 11, 11') can be clamped between the clamp shaft (22, 23) and the measuring shaft (16, 17).

13. The supply device according to claim 12, wherein the clamp shaft (22, 23) and/or the measuring shaft (16, 17) can be actively driven in a rotating manner via transfer drive means to unwind the corresponding one of the substrate strips (10, 10'; 11, 11').

14. The supply device according to claim 1, wherein the relative guiding position is an automatic guiding of the corresponding substrate strip (10, 10', 11, 11') from the corresponding roll of the substrate strip rolls (8, 9) through the gap between the measuring shaft (16, 17) and the auxiliary shaft (18, 19).

15. A system (1) comprising a supply device (3) according to claim 1, wherein said double-belt press (2) is disposed downstream of the supply device (3) for pressing the several substrate strips (10, 10'; 11, 11') together.

16. A method for operating a supply device (3) according to claim 1, and/or a system (1) according to claim 15, wherein the respective substrate strip roll (8, 9) is disposed on the unwinding shaft (6, 7) of the at least one unwinding station (4), and wherein the auxiliary shaft (18, 19) and the measuring shaft (16, 17) are moved into the relative guiding position by moving the auxiliary shaft (18, 19) relative to a fixed measuring shaft (16, 17), and wherein the corresponding substrate strip (10, 10'; 11, 11') from the substrate strip roll (8, 9) is guided under gravity through the gap between the auxiliary shaft (18, 19) and the measuring shaft (16, 17), by driving the unwinding shaft (6, 7), and a wrap angle (x) of the substrate strip (10, 10'; 11, 11') around the measuring shaft (16, 17) is adjusted by moving the auxiliary shaft (18, 19) and the measuring shaft (16, 17) relative to one another into the relative operating position.

17. The method according to claim 16, wherein the corresponding substrate strip (10, 10'; 11, 11') is clamped between the measuring shaft (16, 17) and a clamp shaft (22, 23) and is driven by the measuring shaft (16, 17) and the clamp shaft (22, 23) and the corresponding substrate strip is transferred towards the double-belt press (2) by means of a transfer means (12), in such a manner that the substrate strip (10, 10'; 11, 11') is moved against a deflection shaft (24, 25) at an outlet side by the transfer means (12).

18. The method according to claim 16, wherein a braking torque which is controlled depending on the force measured by means of the measuring shaft (16, 17) is applied to the corresponding substrate strip (10, 10'; 11, 11') by brake means which are formed by an unwinding drive means for driving the unwinding shaft (6, 7).

* * * * *